United States Patent
Bunker

(10) Patent No.: US 10,005,160 B2
(45) Date of Patent: Jun. 26, 2018

(54) REPAIR METHODS FOR COOLED COMPONENTS

(71) Applicant: General Electric Company, Schenectady, NY (US)

(72) Inventor: Ronald Scott Bunker, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 186 days.

(21) Appl. No.: 14/720,614

(22) Filed: May 22, 2015

(65) Prior Publication Data
US 2015/0251280 A1 Sep. 10, 2015

Related U.S. Application Data

(62) Division of application No. 13/267,617, filed on Oct. 6, 2011.

(51) Int. Cl.
*B23P 6/00* (2006.01)
*C23C 4/00* (2016.01)
(Continued)

(52) U.S. Cl.
CPC ............... *B23P 6/002* (2013.01); *C23C 4/00* (2013.01); *C23C 28/321* (2013.01);
(Continued)

(58) Field of Classification Search
CPC . F01D 5/005; F01D 5/085; F01D 5/18; B23P 6/002; B23P 6/005; B23P 6/007; B23P 6/04; B23P 6/045; Y02T 50/676
See application file for complete search history.

(56) References Cited

U.S. PATENT DOCUMENTS 4,141,127 A * 2/1979 Cretella ............... B23K 10/027
228/119
4,285,459 A * 8/1981 Baladjanian .......... B22F 1/0003
228/119
(Continued)

FOREIGN PATENT DOCUMENTS

CN 101412054 A 4/2009
CN 101429893 A 5/2009
EP 1387040 B1 4/2004

OTHER PUBLICATIONS

D.G. Hyams et al., "A Detailed Analysis of film Cooling Physics: Part III—Streamwise Injection With Shaped Holes," Journal of Turbomachinery, vol. 122, Issue 1, Jan. 2000, pp. 122-132.
(Continued)

*Primary Examiner* — Christopher M Koehler
(74) *Attorney, Agent, or Firm* — GE Global Patent Operation; John Darling

(57) ABSTRACT

A method for repairing a component is provided, where the component has a substrate comprising an outer surface and an inner surface and defining one or more grooves. Each groove extends at least partially along the outer surface of the substrate. The component further includes a structural coating, a bond coating, and a thermal barrier coating. The groove(s) and the structural coating define one or more channels for cooling the component. The repair method includes removing the thermal barrier and bond coatings, removing at least a portion of the structural coating in a vicinity of a damaged portion of the component, performing a repair operation on the damaged portion of the component, applying a structural coating at least in a vicinity of the repaired portion of the component, and applying a bond coating and a thermal barrier coating. Additional repair methods are also provided.

22 Claims, 8 Drawing Sheets

(51) Int. Cl.
*F01D 5/00* (2006.01)
*C23C 28/00* (2006.01)
*F02C 7/12* (2006.01)
*F01D 5/18* (2006.01)
*F01D 5/28* (2006.01)

(52) U.S. Cl.
CPC .......... *C23C 28/3455* (2013.01); *F01D 5/005* (2013.01); *F02C 7/12* (2013.01); *F01D 5/187* (2013.01); *F01D 5/288* (2013.01); *F05D 2230/80* (2013.01); *F05D 2260/204* (2013.01); *Y02T 50/672* (2013.01); *Y02T 50/676* (2013.01); *Y10T 29/49721* (2015.01); *Y10T 29/49746* (2015.01)

(56) References Cited

U.S. PATENT DOCUMENTS

| | | | |
|---|---|---|---|
| 4,726,104 A * | 2/1988 | Foster | B23K 35/224 228/118 |
| 5,626,462 A | 5/1997 | Jackson et al. | |
| 5,640,767 A | 6/1997 | Jackson et al. | |
| 5,875,549 A | 3/1999 | McKinley | |
| 5,900,102 A * | 5/1999 | Reeves | C23C 10/60 134/19 |
| 5,935,718 A * | 8/1999 | Demo | B23K 3/087 428/577 |
| 5,958,166 A * | 9/1999 | Walters | B29C 73/04 156/94 |
| 5,972,424 A * | 10/1999 | Draghi | B23P 6/007 29/889.1 |
| 6,214,248 B1 | 4/2001 | Browning et al. | |
| 6,234,755 B1 | 5/2001 | Bunker et al. | |
| 6,243,948 B1 * | 6/2001 | Lee | B23P 6/002 29/402.05 |
| 6,321,449 B2 | 11/2001 | Zhao et al. | |
| 6,368,060 B1 | 4/2002 | Fehrenbach et al. | |
| 6,383,602 B1 | 5/2002 | Frio et al. | |
| 6,405,435 B1 | 6/2002 | Konter et al. | |
| 6,412,541 B2 | 7/2002 | Roester et al. | |
| 6,427,327 B1 | 8/2002 | Bunker | |
| 6,434,823 B1 * | 8/2002 | Gupta | B23P 6/007 29/402.18 |
| 6,434,825 B1 | 8/2002 | Gupta et al. | |
| 6,551,061 B2 | 4/2003 | Darolia et al. | |
| 6,582,194 B1 | 6/2003 | Birkner et al. | |
| 6,602,053 B2 | 8/2003 | Suramanian et al. | |
| 6,617,003 B1 | 9/2003 | Lee et al. | |
| 6,905,302 B2 | 6/2005 | Lee et al. | |
| 6,908,657 B2 | 6/2005 | Farmer et al. | |
| 6,921,014 B2 | 7/2005 | Hasz et al. | |
| 7,014,923 B2 | 3/2006 | Schnell et al. | |
| 7,094,475 B2 | 8/2006 | Schnell et al. | |
| 7,186,167 B2 | 3/2007 | Joslin | |
| 7,204,019 B2 * | 4/2007 | Ducotey, Jr. | B23H 9/10 29/402.06 |
| 7,216,428 B2 | 5/2007 | Memmen et al. | |
| 7,302,990 B2 | 12/2007 | Bunker et al. | |
| 7,744,348 B2 | 6/2010 | Bezencon et al. | |
| 7,766,617 B1 | 8/2010 | Liang | |
| 7,775,768 B2 | 8/2010 | Devore et al. | |
| 7,805,822 B2 | 10/2010 | Hanley | |
| 8,091,227 B2 * | 1/2012 | Hong | B23P 6/007 29/402.18 |
| 8,210,815 B2 | 7/2012 | Bezencon et al. | |
| 8,387,245 B2 | 3/2013 | Bunker et al. | |
| 8,528,208 B2 | 9/2013 | Rebak et al. | |
| 8,533,949 B2 | 9/2013 | Bunker | |
| 8,535,491 B2 | 9/2013 | Wei et al. | |
| 8,601,691 B2 | 12/2013 | Rebak et al. | |
| 8,651,805 B2 | 2/2014 | Lacy et al. | |
| 8,673,397 B2 | 3/2014 | Bunker et al. | |
| 8,727,727 B2 | 5/2014 | Bunker et al. | |
| 8,739,404 B2 | 6/2014 | Bunker et al. | |
| 8,857,055 B2 | 10/2014 | Wei et al. | |
| 8,905,713 B2 | 12/2014 | Bunker et al. | |
| 2003/0021892 A1 | 1/2003 | Conner et al. | |
| 2003/0037436 A1 * | 2/2003 | Ducotey, Jr. | B23H 9/10 29/889.1 |
| 2004/0115447 A1 * | 6/2004 | Farmer | B23P 6/002 428/469 |
| 2005/0126001 A1 * | 6/2005 | Hanley | B23P 6/002 29/889.1 |
| 2007/0044306 A1 * | 3/2007 | Szela | B23K 9/04 29/889.1 |
| 2007/0084582 A1 * | 4/2007 | Govern | B23K 9/0026 164/137 |
| 2008/0085395 A1 | 4/2008 | Fernihough et al. | |
| 2008/0138529 A1 | 6/2008 | Weaver et al. | |
| 2008/0159870 A1 * | 7/2008 | Hong | B23P 6/007 416/224 |
| 2009/0142548 A1 | 6/2009 | Patterson et al. | |
| 2009/0194247 A1 * | 8/2009 | Kriegl | B23P 6/007 164/76.1 |
| 2010/0080688 A1 * | 4/2010 | Bezencon | B23P 15/02 415/115 |
| 2010/0126014 A1 * | 5/2010 | Gupta | B23P 6/007 29/889.1 |
| 2011/0189259 A1 | 8/2011 | Vasisht et al. | |
| 2012/0051941 A1 * | 3/2012 | Bunker | F01D 5/186 416/97 R |
| 2012/0088064 A1 * | 4/2012 | Bolz | C23C 14/042 428/131 |
| 2012/0094029 A1 * | 4/2012 | Halberstadt | C23C 4/12 427/446 |
| 2012/0114868 A1 | 5/2012 | Bunker et al. | |
| 2012/0148769 A1 | 6/2012 | Bunker et al. | |
| 2012/0243995 A1 | 9/2012 | Bunker et al. | |
| 2012/0325451 A1 | 12/2012 | Bunker | |
| 2012/0328448 A1 | 12/2012 | Bunker | |
| 2013/0043009 A1 | 2/2013 | Bunker et al. | |

OTHER PUBLICATIONS

J.E.J. Lambie et al., "An overview on micro-meso manufacturing techniques for micro-heat exchangers for turbine blade cooling," International Journal Manufacturing Research, vol. 3, No. 1, 2008, pp. 3-26.

Unofficial English Translation of Chinese Office Action issued in connection with corresponding CN Application No. 201210365086.9 dated Dec. 29, 2015.

European Search Report and Written Opinion issued in connection with corresponding EP Application No. 12187140.4 dated Feb. 16, 2016.

* cited by examiner

US 10,005,160 B2

REPAIR METHODS FOR COOLED COMPONENTS

BACKGROUND

The disclosure relates generally to gas turbine engines, and, more specifically, to repair methods for cooled components.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy typically results in comparatively low heat transfer rates and non-uniform component temperature profiles.

Micro-channel cooling has the potential to significantly reduce cooling requirements by placing the cooling as close as possible to the heated region, thus reducing the temperature difference between the hot side and cold side of the main load bearing substrate material for a given heat transfer rate.

As cooled turbine components are exposed to severe conditions during engine operation, they may crack or suffer other distress, such as burning. Repair operations may therefore be required. Repair processes for conventionally cooled components can be time consuming and costly and would not be directly applicable to micro-channel cooled components.

It would therefore be desirable to develop repair processes suitable for repairing micro-channel cooled components. It would further be desirable to develop repair processes to add micro-channel cooling to modify the cooling scheme for conventionally cooled components, in order to alleviate local, thermal distress within the components.

BRIEF DESCRIPTION

One aspect of the present disclosure resides in a method for repairing a component having a substrate comprising an outer surface and an inner surface, where the inner surface defines at least one hollow, interior space. The substrate defines one or more grooves, where each groove extends at least partially along the outer surface of the substrate. The component further comprises a structural coating disposed over at least a portion of the outer surface of the substrate, a bond coating disposed over the structural coating, and a thermal barrier coating disposed over the bond coating. The groove(s) and the structural coating together define one or more channels for cooling the component. The repair method includes removing the thermal barrier coating, removing the bond coating, removing at least a portion of the structural coating in a vicinity of a damaged portion of the component, and performing a repair operation on the damaged portion of the component. The repair method further includes applying a structural coating at least in a vicinity of the repaired portion of the component, applying a bond coating over the structural coating, and applying a thermal barrier coating over the bond coating.

Another aspect of the disclosure resides in a method for repairing a component having a substrate comprising an outer surface and an inner surface, where the inner surface defines at least one hollow, interior space. One or more grooves extend at least partially along the component. The component further comprises a structural coating disposed over at least a portion of the outer surface of the substrate, a bond coating disposed over the structural coating, and a thermal barrier coating disposed over the bond coating. The structural coating comprises an inner structural coating layer disposed on the outer surface of the substrate and an outer structural coating layer disposed on the inner structural coating layer. Each groove is formed at least partially in the inner structural coating layer. The groove(s) and the structural coating together define one or more channels for cooling the component. The repair method includes removing the thermal barrier coating, removing the bond coating, removing at least a portion of the outer structural coating layer in a vicinity of a damaged portion of the inner structural coating layer, and performing a repair operation on the damaged portion of the inner structural coating layer. The repair method further includes applying an outer structural coating layer over any exposed portions of the inner structural coating layer, applying a bond coating over the outer structural coating, and applying a thermal barrier coating over the bond coating.

Yet another aspect of the present disclosure resides in a method for repairing a component having a substrate comprising an outer surface and an inner surface. The inner surface defines at least one hollow, interior space, and the substrate defines one or more grooves. Each groove extends at least partially along the outer surface of the substrate and has a base and a top. Each groove narrows at the respective top thereof, such that each groove comprises a re-entrant shaped groove. The component further comprises a structural coating disposed over at least a portion of the outer surface of the substrate, a bond coating disposed over the structural coating, and a thermal barrier coating disposed over the bond coating. The re-entrant shaped groove(s) and the structural coating together define one or more re-entrant shaped channels for cooling the component. The repair method includes removing the thermal barrier coating, removing the bond coating, removing at least a portion of the structural coating in a vicinity of a damaged portion of the component, and performing a repair operation on the damaged portion of the component. The repair method further includes applying a structural coating at least in a vicinity of the repaired portion of the component, applying a bond coating over the structural coating, and applying a thermal barrier coating over the bond coating.

Still another aspect of the present disclosure resides in a method for repairing a component having a substrate comprising an outer surface and an inner surface, where the inner surface defines at least one hollow, interior space. The component further comprises a structural coating disposed over at least a portion of the outer surface of the substrate, a bond coating disposed over the structural coating, and a thermal barrier coating disposed over the bond coating. The repair method includes removing the thermal barrier coating, removing the bond coating, and removing at least a portion of the structural coating in a vicinity of a damaged portion of the component. The method further includes forming one or more grooves in the substrate, applying a structural coating at least in a vicinity of the repaired portion of the component, applying a bond coating over the structural coating, and applying a thermal barrier coating over the bond coating. Each groove extends at least partially along the outer surface of the substrate, and the groove(s) and the structural coating together define one or more channels for cooling the component.

DRAWINGS

These and other features, aspects, and advantages of the present disclosure will become better understood when the following detailed description is read with reference to the accompanying drawings in which like characters represent like parts throughout the drawings, wherein.

Figure 3:
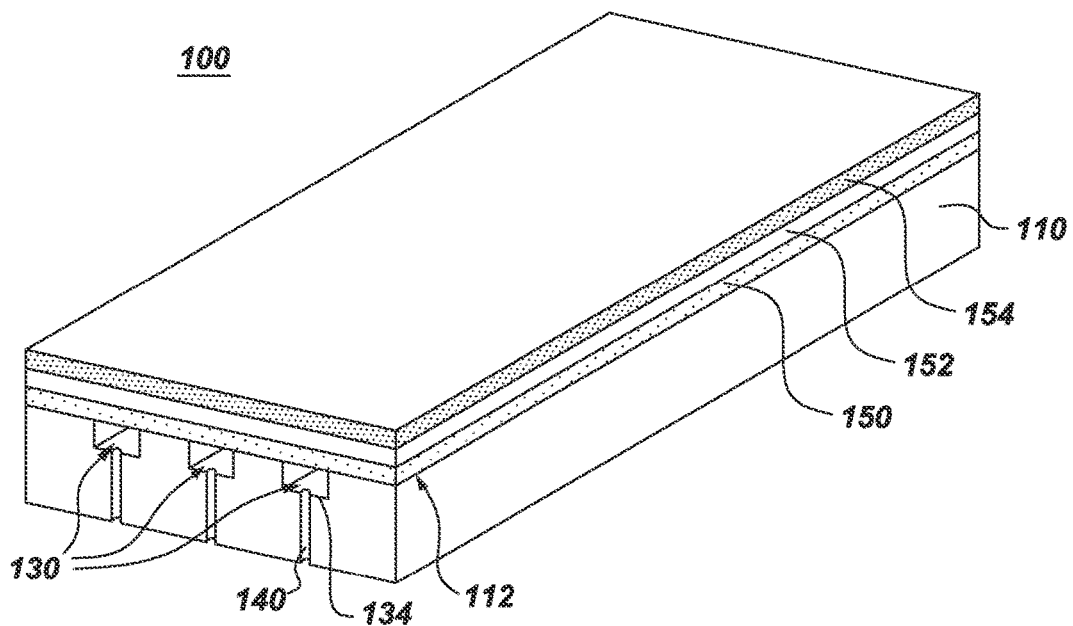
Figure 4:
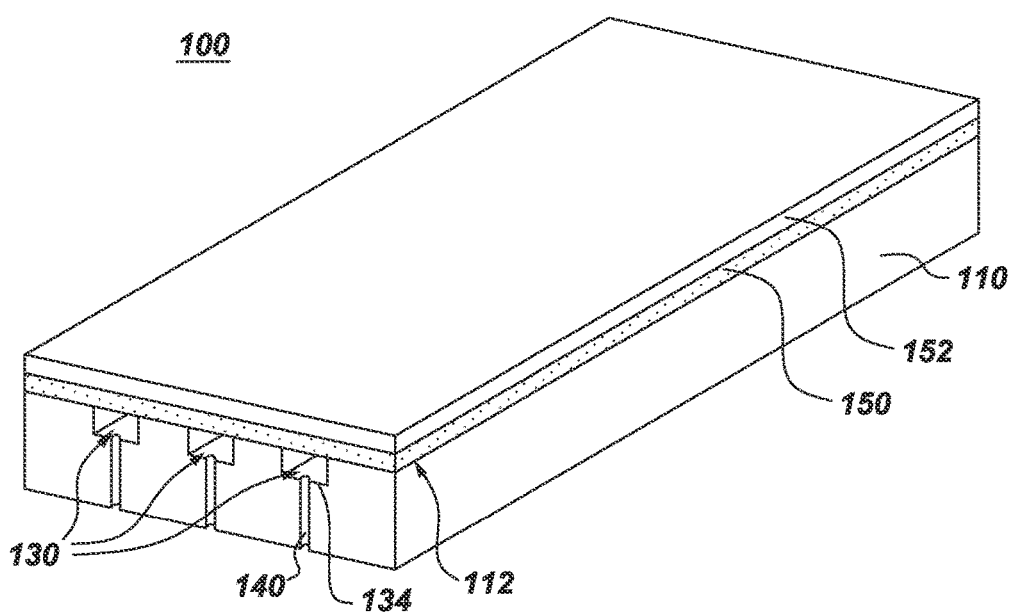
Figure 5:
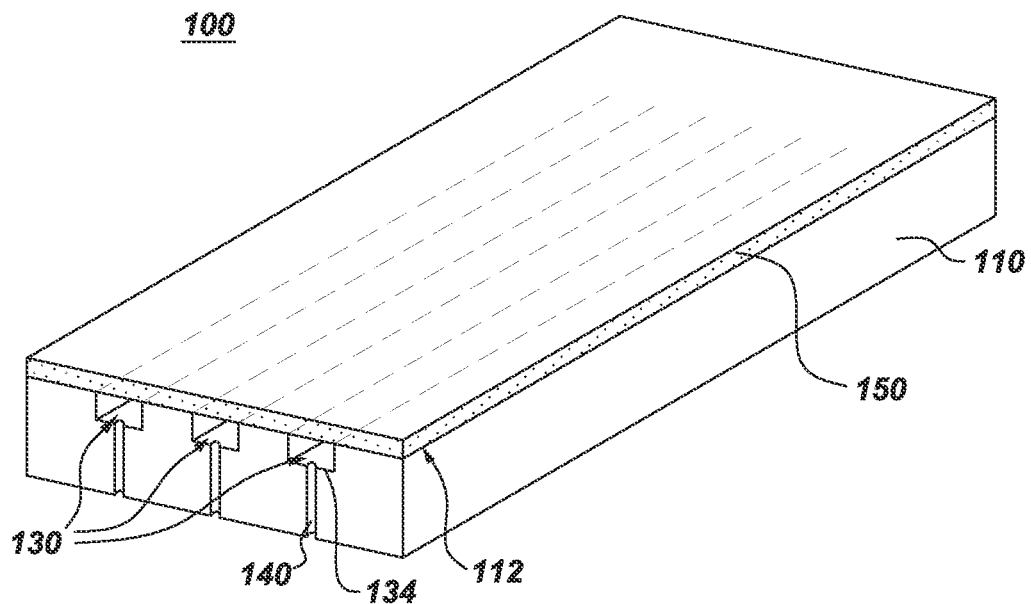
Figure 6:
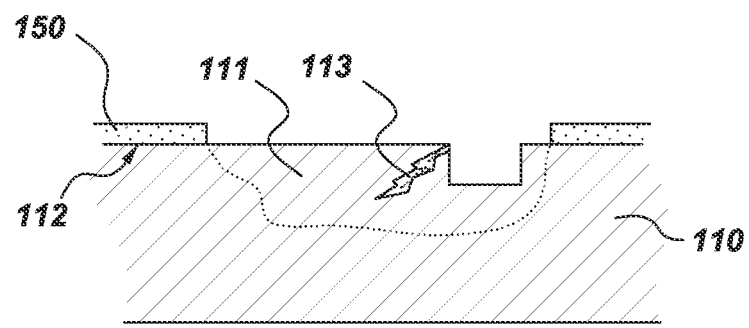
Figure 7:
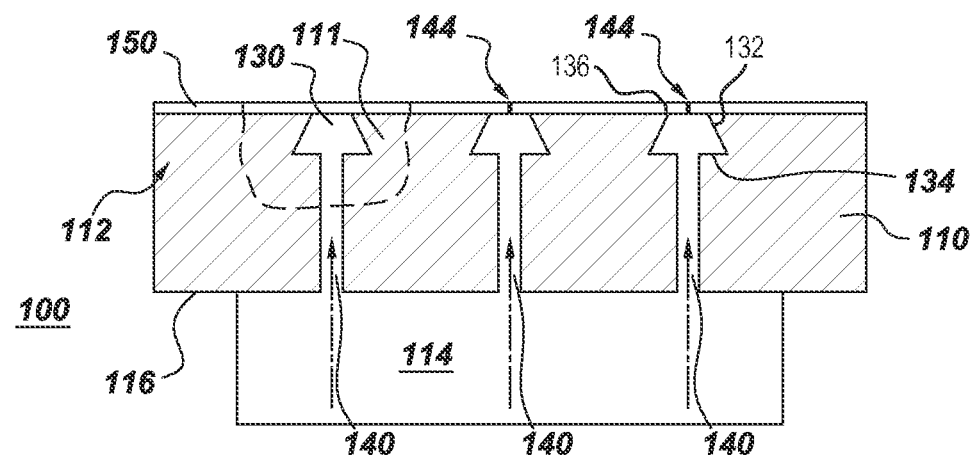
Figure 8:
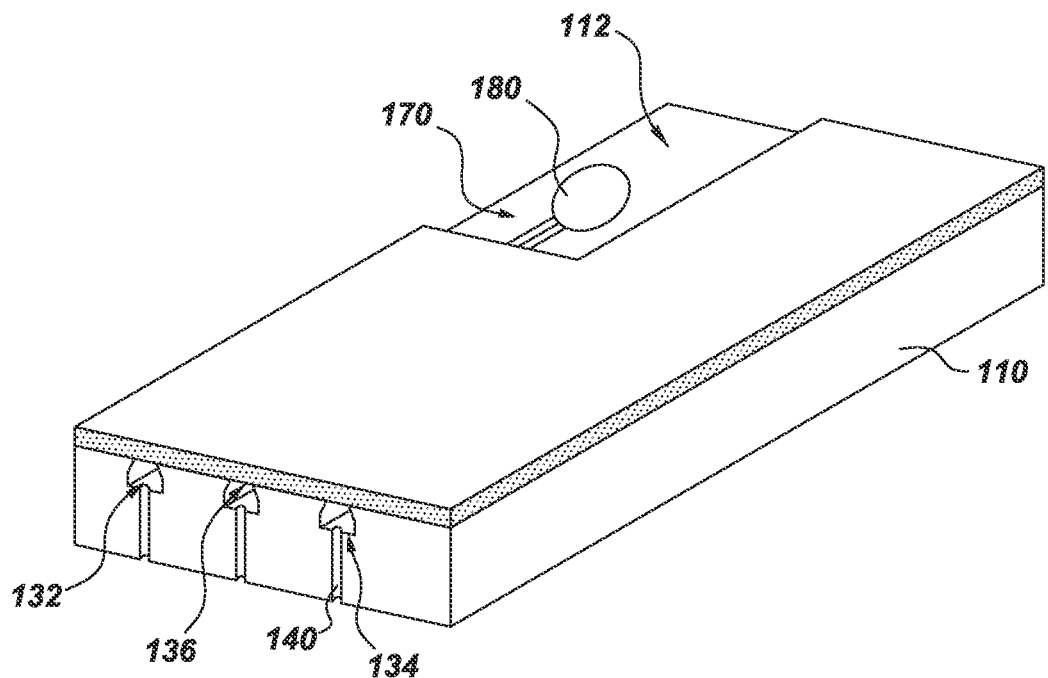
Figure 9:
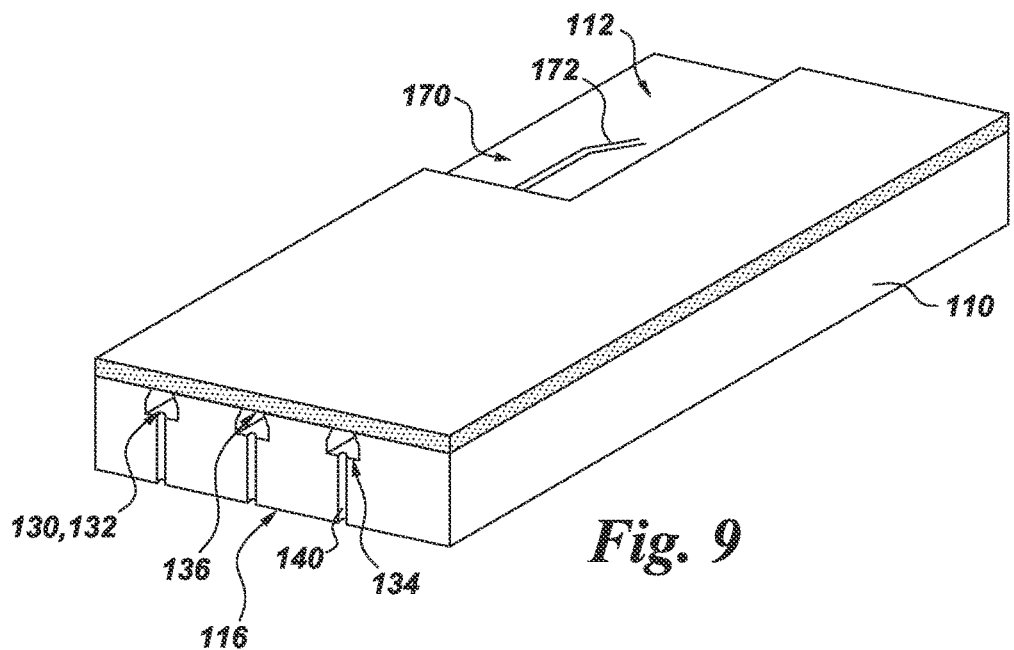
Figure 10:
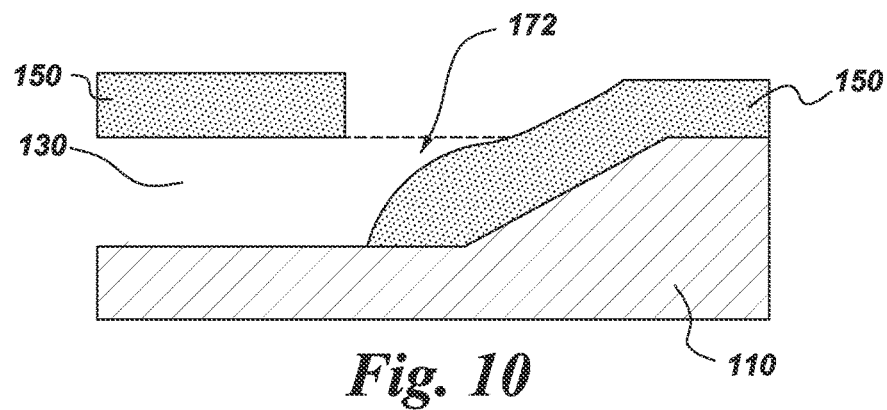
Figure 11:
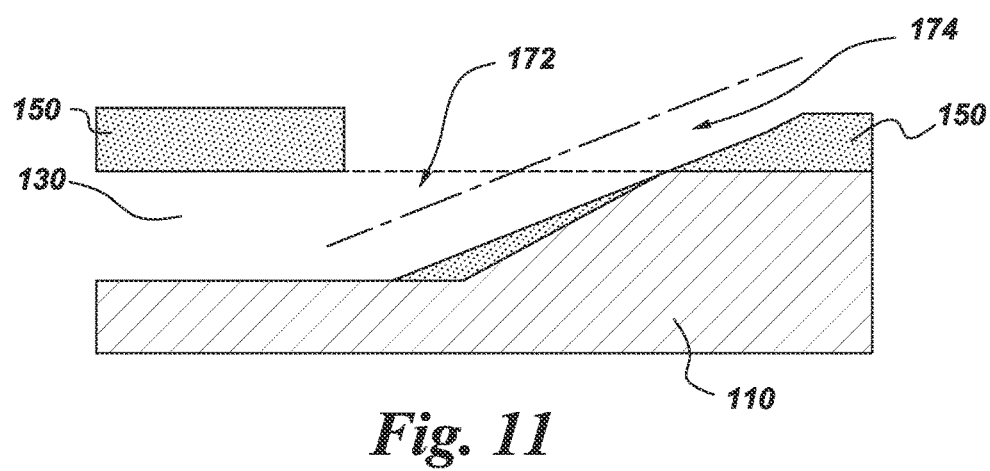
Figure 12:
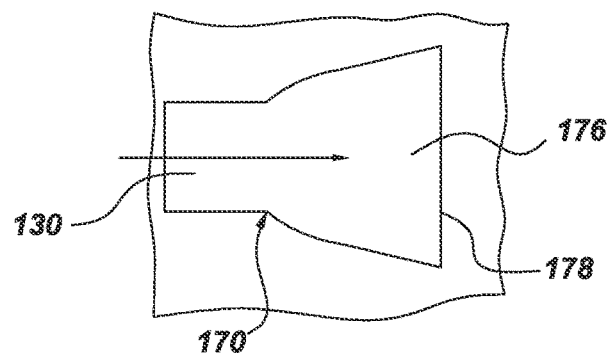
Figure 13:
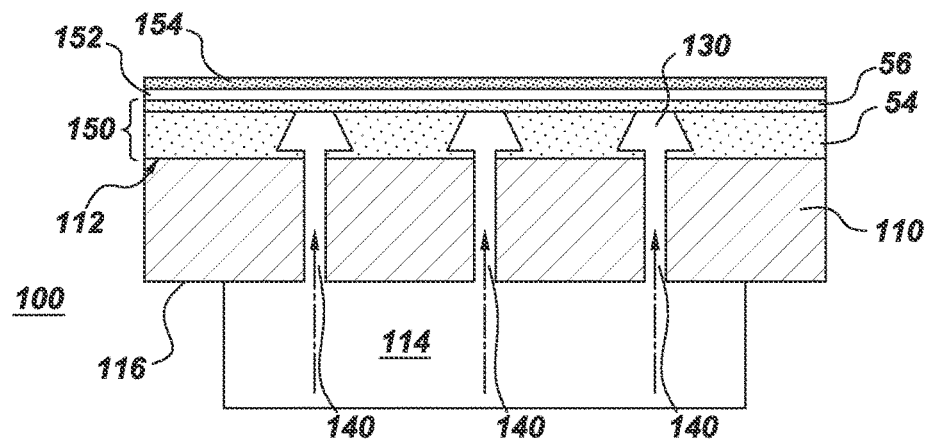
Figure 14:
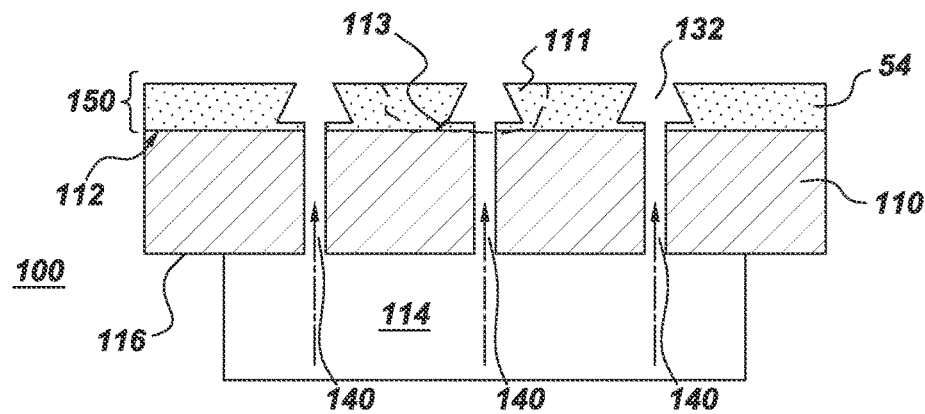
Figure 15:
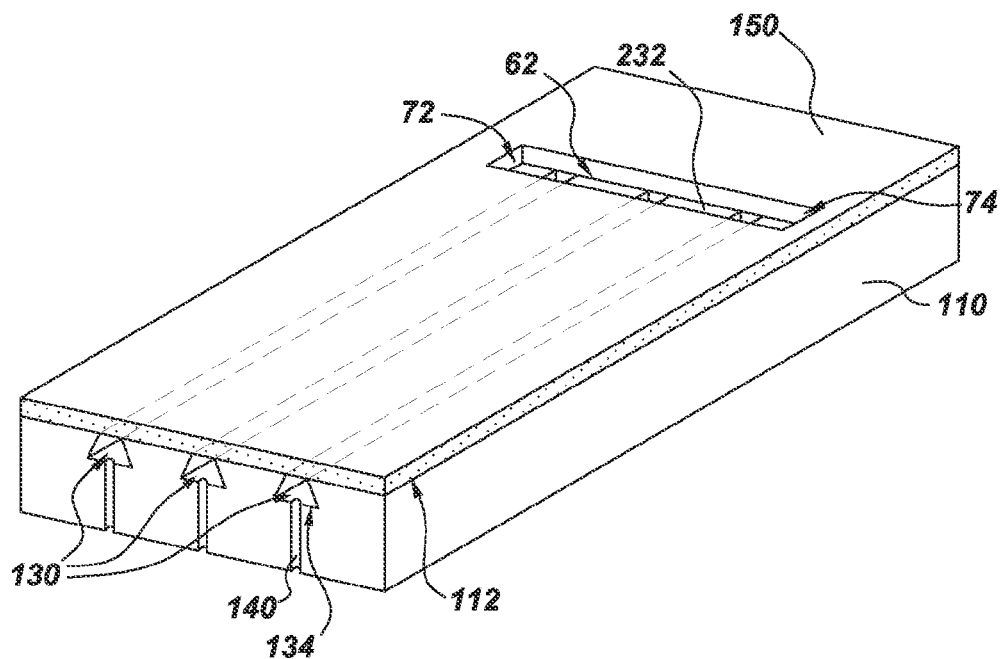
Figure 16:
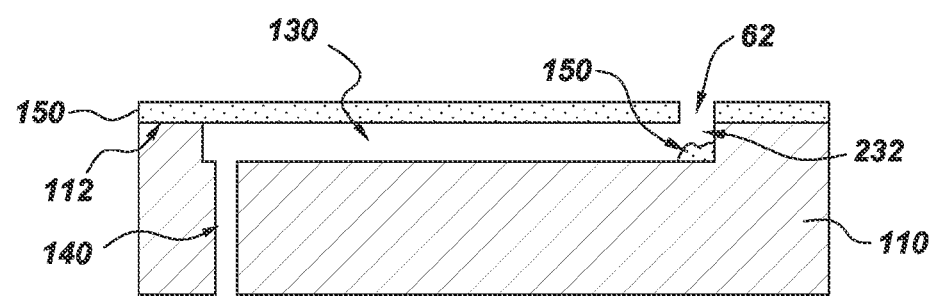
Figure 17:
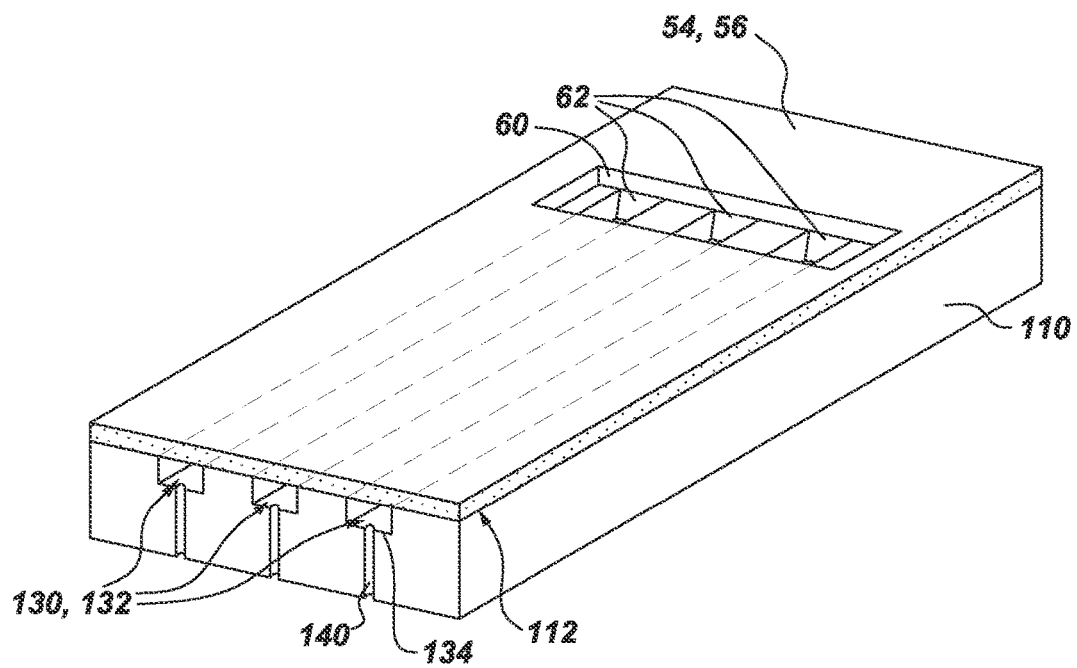
Figure 18:
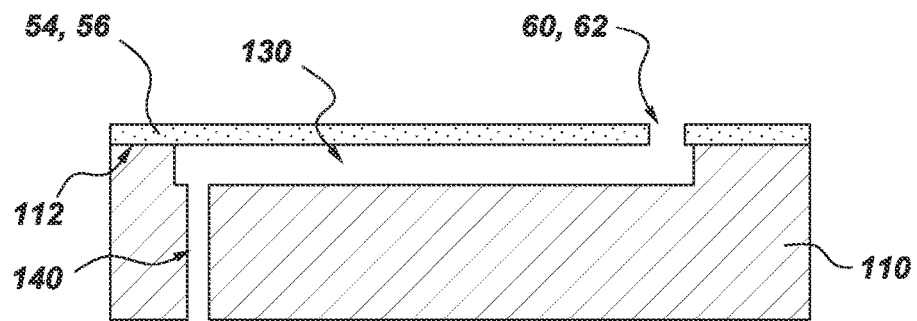

FIG. 3 schematically depicts, in perspective view, three example open shaped cooling grooves that extend partially along the surface of the substrate, where the substrate is covered by a structural coating, a bond coat, and a thermal barrier coating;

FIG. 4 schematically depicts, in perspective view, the cooling grooves of FIG. 3, where the thermal barrier coating has been removed;

FIG. 5 schematically depicts, in perspective view, the cooling grooves of FIG. 4, where the bond coat has also been removed;

FIG. 6 schematically depicts the local removal of a portion of the structural coating in the vicinity of a damaged portion of the substrate near an open shaped groove;

FIG. 7 schematically depicts the local application of a portion of the structural coating in the vicinity of a repaired portion of the substrate, for a re-entrant shaped channel;

FIG. 8 depicts the formation of an example crater in the substrate;

FIG. 9 depicts the formation of example run-out regions in the substrate;

FIG. 10 shows an example cooling channel and run-out region with a structural coating applied;

FIG. 11 shows the example cooling channel of FIG. 10 with a film hole formed in the run-out region by removal of a portion of the coating in the run-out region;

FIG. 12 is a top view of an example diffuser-shaped run-out region, which is wider than the respective groove;

FIG. 13 schematically depicts three re-entrant shaped cooling channels formed in an inner structural coating layer;

FIG. 14 shows the re-entrant shaped grooves of FIG. 13 with the thermal barrier coating, bond coat, and the outer layer of the structural coating removed;

FIG. 15 schematically depicts, in perspective view, three example re-entrant shaped cooling grooves that extend partially along the surface of the substrate and channel coolant to an exit region formed by a connecting groove;

FIG. 16 is a cross-sectional view of one of the example cooling channels of FIG. 15 and shows the channel conveying coolant from an access hole to an exit region formed by a connecting groove;

FIG. 17 schematically depicts, in perspective view, three example cooling channels that extend partially along the surface of the substrate and channel coolant to respective exit regions formed in a trench in the coating; and FIG. 18 is a cross-sectional view of one of the example cooling channels of FIG. 17 and shows the channel conveying coolant from an access hole to an exit region formed in a trench in the coating.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
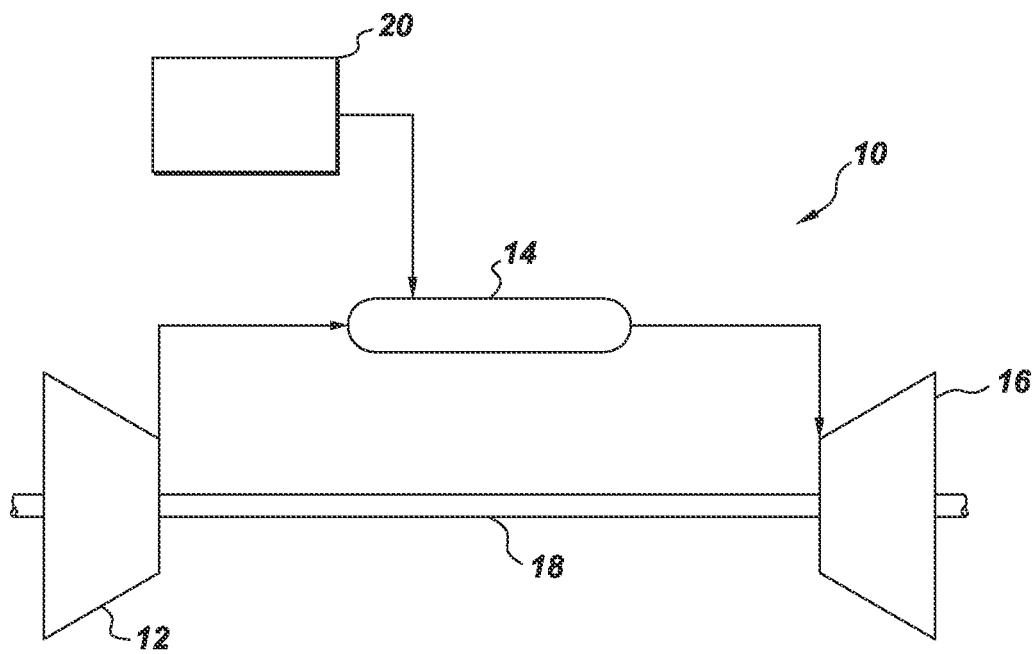
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

Figure 2:
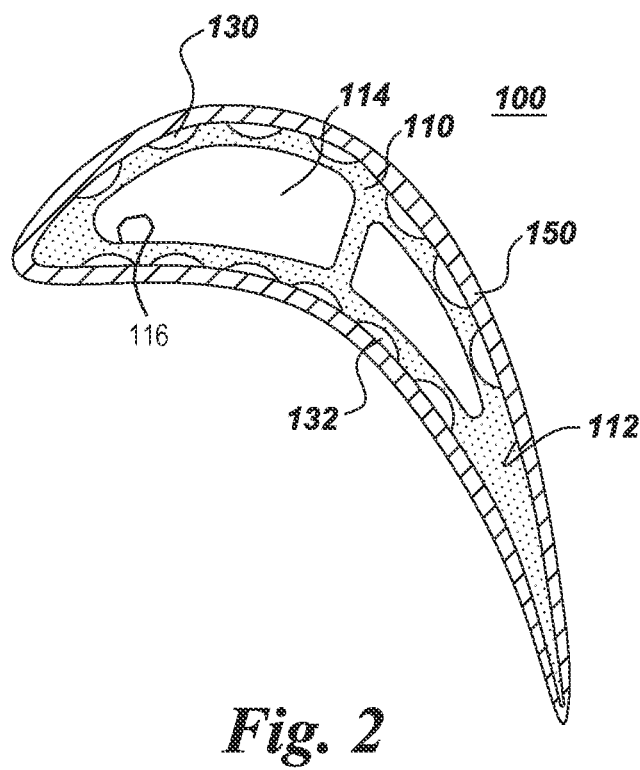
FIG. 2 is a schematic cross-section of an example airfoil configuration with cooling channels, in accordance with aspects of the present disclosure.

The gas turbine system 10 may include a number of hot gas path components 100 (see FIG. 2). A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present disclosure is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow, the hot gas path component 100 is heated by the hot gas flow and may reach a temperature at which the hot gas path component 100 fails. Thus, in order to allow system 10 to operate with hot gas flow 80 at a high temperature, increasing the efficiency and performance of the system 10, a cooling system for the hot gas path component 100 is required.

In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.15 mm to 0.5 mm. The hot gas path component may be provided with a cover layer. A cooling fluid may be provided to the channels from a plenum, and the cooling fluid may flow through the channels, cooling the cover layer.

A method for repairing a component 100 is described with reference to FIGS. 2-12. As indicated in FIG. 2, for example, the component 100 has a substrate 110 comprising an outer surface 112 and an inner surface 116, where the inner surface 116 defines at least one hollow, interior space 114. As indicated, for example, in FIGS. 2-5, the substrate 110 defines one or more grooves 132, where each groove 132 extends at least partially along the outer surface of the substrate 110. As indicated, for example, in FIGS. 3-5, the component 100 further includes a structural coating 150 disposed over at least a portion of the outer surface 112 of the substrate 110, a bond coating 152 disposed over the structural coating, and a thermal barrier coating 154 disposed over the bond coating. As indicated, for example, in FIG. 5, the groove(s) 132 and the structural coating 150 together define one or more channels 130 for cooling the component 100.

As discussed in U.S. Pat. No. 5,626,462, Melvin R. Jackson et al., "Double-wall airfoil," which is incorporated herein in its entirety, substrate 110 may be formed from any suitable material. Depending on the intended application for component 100, this could include Ni-base, Co-base and Fe-base superalloys. The Ni-base superalloys may be those containing both γ and g' phases, particularly those Ni-base superalloys containing both g and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5) Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and $Mo_3Si$ second phases. For other configurations, the substrate material comprises a ceramic matrix composite, such as a silicon carbide (SiC) matrix reinforced with SiC fibers. For other configurations the substrate material comprises a TiAl-based intermetallic compound.

For particular configurations, the structural coating 150 has a thickness in the range of 0.1-2.0 millimeters, and more particularly, in the range of 0.1 to 1 millimeter, and still more particularly 0.1 to 0.5 millimeters for industrial components. For aviation components, this range is typically 0.1 to 0.25 millimeters. However, other thicknesses may be utilized depending on the requirements for a particular component 100. For certain hot gas path components 100, the structural coating 150 comprises a nickel-based or cobalt-based alloy, and more particularly comprises a superalloy or a (NiCo) CrAlY alloy. For example, where the substrate material is a Ni-base superalloy containing both γ and γ' phases, structural coating may comprise similar compositions of materials, as discussed in U.S. Pat. No. 5,626,462.

Referring now to FIGS. 3 and 4, the repair method comprises removing the thermal barrier coating 154. For example, the thermal barrier coating may be removed mechanically, for example by grit blasting. As indicated in FIGS. 4 and 5, the repair method further comprises removing the bond coating 152. For example, the bond coating may be removed chemically. As indicated, for example, in FIG. 6, the repair method further includes removing at least a portion of the structural coating 150 in a vicinity of a damaged portion 111 of the component and performing a repair operation on the damaged portion 111 of the component 110. For the illustrated example shown in FIG. 6, the structural coating 150 is locally removed. However, for other process configurations, the structural coating 150 may be globally removed. For example, any cracks 113 in the substrate may be repaired using a braze material or by performing laser consolidation. The repair operation may encompass repairing a damaged portion of the substrate, coating, or both the coating and the substrate. It should be noted that for certain configurations (not shown), the structural coating 150 comprises the bond coating 152, such that the thermal barrier coating is disposed on the structural coating 150. However, for the illustrated arrangements, the structural coating 150 and the bond coating 152 are distinct coatings.

As indicated in FIG. 7, the repair method further comprises applying a structural coating 150 at least in a vicinity of the repaired portion 111 of the substrate 110. For the example illustrated by FIG. 7, the structural coating is locally applied in the vicinity of the repaired portion 111 of the substrate 110. However, for other process configurations, the structural coating 150 may be globally applied to the substrate 110. The repair method further comprises applying a bond coating 152 (FIG. 4) over the structural coating 150 and applying a thermal barrier coating 154 (FIG. 3) over the bond coating 152. The coating layer(s) may be deposited using a variety of techniques. For particular processes, the structural coating layer(s) are deposited by performing an ion plasma deposition (cathodic arc). Example ion plasma deposition apparatus and method are provided in commonly assigned, US Published Patent Application No. 10080138529, Weaver et al, "Method and apparatus for cathodic arc ion plasma deposition," which is incorporated by reference herein in its entirety. Briefly, ion plasma deposition comprises placing a cathode formed of a coating material into a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a coating deposited using ion plasma deposition include structural coatings, as well as bond coatings and oxidation-resistant coatings, as discussed in greater detail below with reference to U.S. Pat. No. 5,626,462, Jackson et al., "Double-wall airfoil." For certain hot gas path components 100, the structural coating comprises a nickel-based or cobalt-based alloy, and more particularly comprises a superalloy or a (NiCo)CrAlY alloy.

For other process configurations, the structural coating is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a NiCrAlY coating is deposited by HVOF or HVAF. Other example techniques for depositing the structural coating include, without limitation, sputtering, electron beam physical vapor deposition, electroless plating, and electroplating.

For certain configurations, it is desirable to employ multiple deposition techniques for depositing structural and optional additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

For the configuration shown in FIG. 7, each groove 132 has a base 134 and a top 136. Each groove 132 narrows at the respective top 136 thereof, such that each groove 132 comprises a re-entrant shaped groove 132. For the illustrated arrangements, the base 134 of each groove is wider than the top 136. For particular configurations, the base 134 of each re-entrant shaped groove 132 is at least two times wider than the top 136 of the respective groove 132. For more particular configurations, the base 134 is in a range of about 3-4 times wider than the top 136 of the respective groove 132. Example re-entrant shaped grooves 132 are shown in FIG. 7. The formation of re-entrant shaped cooling channels 130 is described in commonly assigned U.S. patent application Ser. No. 12/943,624, Ronald S. Bunker et al., "Components with re-entrant shaped cooling channels and methods of manufacture," which is incorporated herein in its entirety.

For particular processes, the structural coating 150 is applied without the use of a sacrificial filler, such that the structural coating 150 is applied over open ones of the one or more grooves 132. For particular processes, the structural coating 150 completely bridges the respective grooves 132, such that the structural coating 150 seals the respective cooling channels 130. In FIG. 7, the applied structural coating completely bridges the groove on the left hand side. However, for other processes, the structural coating 150 defines one or more porous gaps 144, such that the structural coating 150 does not completely bridge each of the respective grooves 132. Although, in FIG. 7, the structural coating completely bridges the groove on the left hand side, porous gaps 144 are shown for the two grooves on the right in FIG. 7.

The repair operation may encompass one or more machining operations and be performed using a variety of techniques. For particular processes, the repair operation includes locally machining a portion of at least one of the one or more grooves 132. For example, the local machining operation may be performed using one or more of an abrasive liquid jet, plunge electrochemical machining (ECM), electric discharge machining (EDM) with a spinning electrode (milling EDM) and laser machining. For other processes, the repair operation may include forming one or more additional grooves 132 in the substrate 110 or removing one or more grooves 132 from the substrate 110. Grooves may be removed, for example, by braze fill or weld filling them closed, or by laser consolidation to fill. Beneficially, by adding grooves to a component within a distressed region, cooling may be improved within that region of the component.

For the example arrangement illustrated by FIG. 8, each groove 132 has at least one discharge end 170. For particular processes, the repair method further includes forming a crater 180 prior to the step of applying the structural coating 150, such that the crater 180 is in fluid connection with the respective discharge end 170 for each groove 132. More particularly, the structural coating 150 does not completely bridge each of the one or more craters 180, such that each crater 180 defines a film exit 174. Although the film exit 174 is not shown in FIG. 8, an example film exit 174 is shown in FIG. 11 for another configuration. The formation of film exits in micro-channel cooled components using craters is discussed in commonly assigned U.S. patent application Ser. No. 13/168,144, Ronald S. Bunker, "Components with cooling channels and methods of manufacture," which is incorporated herein in its entirety. For particular processes, each crater 180 may be formed by directing an abrasive liquid jet at the outer surface 112 of the substrate 110. An example crater is shown in FIG. 8. For more particular processes, a portion of the structural coating 150 is deposited in the one or more craters 180, and the repair method further includes removing at least some of the structural coating 150 deposited in each crater to form the film hole 174 for the respective channel 130. Although this additional process step is not expressly shown, it is similar to the step illustrated by FIGS. 10 and 11.

For the configuration shown in FIG. 9, each groove 132 has at least one discharge end 170, and the repair method further includes forming a run-out region 172 adjacent to the respective discharge point 170 for each groove 132. The run-out region 172 is formed prior to the step of locally applying the structural coating 150. For more particular processes, the structural coating 150 does not bridge the run-out region(s) 172, such that each run-out region 172 forms a film hole 174 for the respective groove 132. The formation of film exits in micro-channel cooled components using run-out regions is discussed in commonly assigned U.S. patent application Ser. No. 13/026,595, Ronald S. Bunker, "Components with cooling channels and methods of manufacture," which is incorporated herein in its entirety. For example processes, each run-out region 172 may be formed using an abrasive liquid jet (not shown). For particular applications, each run-out region 172 is formed by lifting the abrasive liquid jet from the outer surface 112 of the substrate 110, such that each run-out region 172 is tapered. For certain configurations, the run-out region 172 is wider than the respective groove 132.

For the particular process illustrated by FIGS. 10 and 11, a portion of the structural coating 150 is deposited in the run-out region(s) 172, as indicated in FIG. 10. As shown in FIG. 11, the repair method further optionally includes removing at least a portion of the structural coating 150 deposited in each run-out region, such that each run-out region 172 forms a film hole 174 for the respective groove 132.

For the configuration shown in FIG. 12, each groove 132 has at least one discharge end 170, and the repair method further includes forming a run-out region 172 adjacent to the respective discharge point 170 for each groove 132, where the run-out region is formed prior to the step of applying the structural coating 150. For the particular configuration shown in FIG. 12, the footprint 176 of each run-out region 172 is narrower at the discharge point 170 for the respective groove 132 and wider at an opposite end 178 of the run-out region 172, such that the run-out region 172 forms a diffuser film hole 174.

In addition to forming run-out regions or craters, repairing cracks, and adding or removing grooves, the repair operation may optionally include one or more of: drilling one or more film holes 174 through the thermal barrier coating 154, bond coating 152, and structural coating 150 to intersect the respective groove(s) 132, repairing one or more connecting grooves 232 (which are described below with reference to FIGS. 15 and 16), repairing one or more run-out regions 172 or craters 180, and repairing one or more trenches 60 (which are described below with reference to FIGS. 17 and 18). Beneficially, by using run-out regions, craters and/or trenches, the repair of conventional film holes (which typically requires either repairing the film holes or relocating the film holes for drilling) is simplified. In addition, for parts with an ion plasma (IPD) structural coating, only the bondcoat and TBC need be stripped off. The IPD coating need not be removed unless a region has extensive damage. In addition, for certain processes, this may apply to thermal spray coatings as well.

Another method for repairing a component 100 is described with reference to FIGS. 2-7 and 13. As described above with reference to FIG. 2, the component 100 has a substrate 110 comprising an outer surface 112 and an inner surface 116. The inner surface 116 defines at least one hollow, interior space 114. As described above with reference to FIGS. 2-5, one or more grooves 132 extend at least partially along the component 100. As described above with reference to FIGS. 3-5, the component further includes a structural coating 150 disposed over at least a portion of the outer surface 112 of the substrate 110, a bond coating 152 disposed over the structural coating 150, and a thermal barrier coating 154 disposed over the bond coating 152. As indicated, for example, in FIG. 13, the structural coating 150 comprises an inner structural coating layer 54 disposed on the outer surface 112 of the substrate 110 and an outer structural coating layer 56 disposed on the inner structural coating layer 54. Each groove 132 is formed at least partially in the inner structural coating layer 54. This arrangement is illustrated, for example, in FIG. 13. For the arrangement shown in FIG. 13, the grooves 132 are formed entirely in the inner structural coating layer 54. However, for other arrangements, not shown, the grooves may extend through the inner structural coating layer 54 into the substrate 110. For the configuration shown in FIG. 3, the grooves 132 are formed in the substrate. The groove(s) 132 and the structural coating 150 together define one or more channels 130 for cooling the component 100.

Similar to the process steps described above with reference to FIGS. 3-6, the repair method comprises removing the thermal barrier coating 154, removing the bond coating 152, and removing at least a portion of the outer structural coating layer 56 in a vicinity of a damaged portion 111 of the inner structural coating layer 54. Depending on the extent of the damage, the outer structural coating layer 56 may be locally or entirely removed. Similar to the process step described above with reference to FIG. 6, the repair method further comprises performing a repair operation on the damaged portion 111 of the inner structural coating layer 54. For example, any damage to the inner structural coating layer 54 may be repaired using a braze material or by performing laser consolidation, or by locally applying the same coating. The repair operation may include locally machining a portion of at least one of the groove(s) 132, as discussed above. Other example repair operations include forming one or more additional grooves 132 at least partially in the inner structural coating layer 54 and/or removing one or more grooves 132 from the inner structural coating layer 54. Grooves may be removed for example, by braze fill or weld filling them closed, or by laser consolidation to fill, as well as by applying the coating and not reforming the groove.

Similar to the process step described above with reference to FIG. 7, the repair method further comprises applying an outer structural coating layer 56 over any exposed portions of the inner structural coating layer 54. If only a portion of the outer structural coating 56 was removed, then the remaining outer structural coating 56 may be covered with a mask (not shown), such that the outer structural coating 56 is only locally applied over the repaired portion of the inner layer of the structural coating 54. Similar to the process described above, the repair method further comprises applying a bond coating 152 over the outer structural coating 56, and applying a thermal barrier coating 154 over the bond coating 152.

For the particular arrangement shown in FIG. 13, each groove 132 has a base 134 and a top 136, each groove 132 narrows at the respective top 136 thereof, such that each groove 132 comprises a re-entrant shaped groove 132. For the illustrated arrangements, the base 134 of each groove is wider than the top 136. Re-entrant grooves are described above. For particular processes, the outer layer of the structural coating 56 is applied without the use of a sacrificial filler, such that the outer layer of the structural coating 56 is applied over open ones of the re-entrant shaped groove(s) 132. More particularly, the applied outer layer of the structural coating 56 completely bridges the respective grooves 132, such that the applied outer layer of the structural coating 56 seals the respective cooling channels 130. For the arrangement shown in FIG. 13, the outer layer of the structural coating 56 completely bridges the grooves 132. For other processes, the outer layer of the structural coating 56 is applied without the use of a sacrificial filler, and the applied outer layer of the structural coating 56 defines one or more porous gaps 144, such that the applied outer layer of the structural coating 56 does not completely bridge each of the respective grooves 132. Example porous grooves 144 are shown in FIG. 7 for the case of channels formed in the substrate. For the present configuration, the gaps 144 shown in FIG. 7 would extend through the outer layer 56 into the grooves 132 formed in the inner layer 54.

Another method for repairing a component 100 is described with reference to FIGS. 2-12 and 15-18. As described above with reference to FIG. 2, the component 100 includes a substrate 110 comprising an outer surface 112 and an inner surface 116, where the inner surface 116 defines at least one hollow, interior space 114. As indicated in FIG. 7, the substrate 110 defines one or more grooves 132, and each groove 132 extends at least partially along the outer surface of the substrate 110. As indicated in FIG. 7, each groove 132 has a base 134 and a top 136, and each groove 132 narrows at the respective top 136 thereof, such that each groove 132 comprises a re-entrant shaped groove 132. For the illustrated arrangements, the base 134 of each groove is wider than the top 136. Re-entrant shaped grooves are described above. As described above with reference to FIGS. 3-5, the component 100 further includes a structural coating 150 disposed over at least a portion of the outer surface 112 of the substrate 110, a bond coating 152 disposed over the structural coating 150, and a thermal barrier coating 154 disposed over the bond coating 152. As shown in FIG. 7, the re-entrant shaped groove(s) 132 and the structural coating 150 together define one or more re-entrant shaped channels 130 for cooling the component 100. Similar to the process steps described above with reference to FIGS. 3-6, the repair method comprises removing the thermal barrier coating 154, removing the bond coating 152, and removing at least a portion of the structural coating 150 in a vicinity of a damaged portion 111 of the component. Depending on the extent of the damage, the structural coating may be locally or entirely removed.

Similar to the process described above with reference to FIGS. 6 and 7, the repair method further includes performing a repair operation on the damaged portion 111 of the component 110, for example, machining a portion of at least one of the one or more re-entrant shaped grooves 132. Other example repair operations include forming one or more additional grooves 132 in the substrate 110 and/or removing one or more grooves 132 from the substrate 110. Beneficially, by adding grooves to a component within a distressed region, cooling may be improved within that region of the component.

The repair method further includes applying a structural coating 150 at least in a vicinity of the repaired portion 111 of the component. For particular processes, the structural coating 150 is applied (locally or globally) without the use of a sacrificial filler, such that the structural coating 150 is applied over open ones of the one or more re-entrant shaped grooves 132. This is facilitated by the relatively narrow openings of the re-entrant shaped grooves. Similar to the process steps described above, the repair method further includes applying a bond coating 152 over the structural coating 150, and applying a thermal barrier coating 154 over the bond coating 152.

For particular embodiments, the entire structural coating 150 is removed. It should be noted that the entire bond coating 152 and thermal barrier coating 154 are also removed. For these embodiments, after the repair operation has been performed, the structural coating 150 is applied globally over the substrate 110. Similarly, the bond coating 152 and thermal barrier coating 154 are also applied globally over the structural coating and bond coating respectively.

For the configuration shown in FIG. 9, each groove 132 has at least one discharge end 170, and the repair method further includes forming a run-out region 172 adjacent to the respective discharge point 170 for each re-entrant shaped groove 132. The run-out region(s) is (are) formed prior to the step of applying the structural coating 150. For particular processes, the applied structural coating 150 does not bridge the run-out region(s) 172, such that each run-out region 172 forms a film hole 174 (FIG. 11) for the respective re-entrant shaped groove 132. As noted above, the formation of film exits in micro-channel cooled components using run-out regions is discussed in commonly assigned U.S. patent application Ser. No. 13/026,595, Ronald S. Bunker, "Components with cooling channels and methods of manufacture." As was also noted above, the run-out regions 172 may be formed using an abrasive liquid jet (not shown). For particular applications, each run-out region 172 is formed by lifting the abrasive liquid jet from the outer surface 112 of the substrate 110, such that each run-out region 172 is tapered. For certain configurations, the run-out region 172 is wider than the respective groove 132. As discussed above, for the particular configuration shown in FIG. 12, the footprint 176 of each run-out region 172 is narrower at the discharge point 170 for the respective groove 132 and wider at an opposite end 178 of the run-out region 172, such that the run-out region 172 forms a diffuser film hole 174.

For the particular process illustrated by FIGS. 10 and 11, a portion of the locally applied structural coating 150 is deposited in the run-out region(s) 172, as indicated in FIG. 10. As shown in FIG. 11, the repair method further optionally includes removing at least a portion of the structural coating 150 deposited in each run-out region, such that each run-out region 172 forms a film hole 174 for the respective groove 132.

For the configuration shown in FIG. 8, each groove 132 has at least one discharge end 170. Similar to the process described above with reference to FIG. 8, the repair method may further optionally include forming a crater 180 prior to the step of locally applying the structural coating 150, such that the crater 180 is in fluid connection with the respective discharge end 170 for each groove 132. More particularly, the locally applied structural coating 150 does not completely bridge each of the one or more craters 180, such that each crater 180 defines a film exit 174. Although the film exit 174 is not shown in FIG. 8, an example film exit 174 is shown in FIG. 11 for another configuration. As noted above, the formation of film exits in micro-channel cooled components using craters is discussed in commonly assigned U.S. patent application Ser. No. 13/168,144, Ronald S. Bunker, "Components with cooling channels and methods of manufacture." For more particular processes, a portion of the locally applied structural coating 150 is deposited in the one or more craters 180, and the repair method further includes removing at least some of the locally applied structural coating 150 deposited in each crater to form the film hole 174 for the respective channel 130. Although this additional process step is not expressly shown, it is similar to the step illustrated by FIGS. 10 and 11.

In addition to forming craters or run-out regions, other features may be formed during the repair method of the present disclosure. For example, FIG. 15 schematically depicts, in perspective view, three example re-entrant shaped cooling grooves that extend partially along the surface of the substrate and channel coolant to an exit region formed by a connecting groove. For this arrangement, the repair method further includes repairing at least one connecting groove 232 in the component 100, such that each connecting groove 232 intersects at least a subset of the one or more re-entrant shaped grooves 132, as indicated in FIG. 15, for example. However, the connecting grooves 232 will be repaired only if damaged. If the connecting groove is in the substrate, then at most, it will need to be repaired. If a portion of the connecting groove extends into the coating 150, then this portion of the connecting groove will require re-application. For particular processes, the connecting groove 232 is repaired prior to the step of applying the structural coating 150, and the applied structural coating 150 does not completely bridge the connecting groove 232, such that the connecting groove 232 at least partially defines an exit region 62 for the respective re-entrant shaped cooling channel(s) 130. The formation of exit regions in micro-channel cooled components using connecting grooves is discussed in commonly assigned U.S. patent application Ser. No. 13/168,117, Ronald S. Bunker, "Components with cooling channels and methods of manufacture," which is incorporated herein in its entirety. For particular processes, the connecting groove(s) 232 may be formed or repaired using an abrasive liquid jet (not shown). More particularly, the abrasive liquid jet may be used to form or repair each connecting groove 232 to approximately the same depth as that of the respective channel 130. As noted above, a connecting groove 232 is illustrated in FIG. 15, and FIG. 16 is a cross-sectional view of one of the example cooling channels of FIG. 15 and shows the channel conveying coolant from an access hole to an exit region formed by a connecting groove.

For particular arrangements, each connecting groove 232 is open-shaped, and a portion of the applied structural coating 150 is disposed in the exit region 62 of respective connecting grooves 232, as indicated in FIG. 16, for example. For this arrangement, the repair method may further optionally include removing at least a portion of the applied structural coating 150 disposed in each exit region 62. For certain applications, a portion of the applied structural coating 150 remains in the one or more exit regions 62 after the removal step. For other applications, all of the applied structural coating 150 within each exit region 62 is removed during the removal step. For certain configurations, the groove(s) 132 and the connecting groove(s) 232 are formed in the outer surface 112 of the substrate 110. For other configurations, the groove(s) 132 and the connecting groove(s) 232 are formed at least partially in an inner structural coating 54. For certain configurations, each connecting groove 232 is re-entrant shaped, and a permeable slot (not shown) extends through the applied structural coating 150 in the exit region 62 for the connecting groove 232. For these configurations, the repair method may further include forming at least one exit hole through the permeable slot.

The repair method may also optionally include the formation of one or more trenches. For example, FIG. 17 schematically depicts, in perspective view, three example cooling channels that extend partially along the surface of the substrate and channel coolant to respective exit regions formed in a trench in the coating. FIG. 18 is a cross-sectional view of one of the example cooling channels of FIG. 17 and shows the channel conveying coolant from an access hole to an exit region formed in a trench in the coating. For this arrangement, the repair method further includes forming at least one or more trenches 60 in the component to at least partially define at least one exit region 62 for the one or more cooling channels 130. The formation of exit regions in micro-channel cooled components using trenches is discussed in commonly assigned U.S. patent application Ser. No. 12/965,083, Ronald S. Bunker, "Components with cooling channels and methods of manufacture," which is incorporated herein in its entirety. For particular processes, the trenches 60 may be formed using one or more of an abrasive liquid jet, plunge electrochemical machining (ECM), electric discharge machining (EDM) with a spinning electrode (milling EDM), laser machining, and computer numerically controlled (CNC) milling.

In addition to the repair operations described above, each of the embodiments described above may include one or more repair operations to repair existing grooves, connecting grooves, craters, trenches, and/or run-out regions, as well as drilling one or more film holes 174 through the thermal barrier coating 154, bond coating 152, and structural coating 150 to intersect the respective groove(s) 132. For particular processes, these repairs may be accomplished using an abrasive liquid jet. Other machining techniques include, without limitation, plunge electrochemical machining (ECM), electric discharge machining (EDM) with a spinning electrode (milling EDM), laser machining, and computer numerically controlled (CNC) milling. In addition and as noted above, the repairs often utilize material addition techniques, such as but not limited to, brazing, welding, and laser consolidation.

Another method for repairing a component 100 is provided. The repair method is similar to those described above but can be applied to conventional components (namely, those not including micro-channels prior to repair) to add micro-channel cooling to any distressed regions on the part. Similar to the processes described above, the repair method includes removing the thermal barrier and bond coatings 154, 152 and removing at least a portion of the structural coating 150 in a vicinity of a damaged portion 111 (the distressed region) of the component. The repair method further includes forming one or more grooves 132 in the substrate 110, where each groove 132 extends at least partially along the outer surface of the substrate 110. The grooves may be formed using a variety of machining techniques, non-limiting examples of which include, abrasive liquid jet, plunge electrochemical machining (ECM), electric discharge machining (EDM) with a spinning electrode (milling EDM), laser machining, and computer numerically controlled (CNC) milling.

The repair method further includes applying a structural coating 150 at least in a vicinity of the repaired portion 111 of the component, where the groove(s) 132 and the applied structural coating 150 together define one or more channels 130 for cooling the component 100. The repair method further includes applying a bond coating 152 over the structural coating 150 and applying a thermal barrier coating 154 over the bond coating 152. It should be noted that for certain configurations (not shown), the structural coating 150 comprises the bond coating 152, such that the thermal barrier coating is disposed on the structural coating 150. However, for the illustrated arrangements, the structural coating 150 and the bond coating 152 are distinct coatings. Beneficially, by adding grooves to a conventional component (namely, a component that does not initially have micro-channel cooling) within a distressed region, cooling may be improved within that region of the component.

In addition to forming grooves, the repair method may optionally further include performing a repair operation on the damaged portion 111 of the component 110 after removing at least the portion of the structural coating 150 and prior to applying the structural coating. The optional repair operation may include one or more of the example repair operations described above. In addition, for particular processes, the grooves added may comprise re-entrant shaped grooves.

Beneficially, the above-described repair processes may be less costly and lead to lower scrap rates than conventional repair processes for conventional (without micro-channels) components. For example, where the damage is localized, it may not be necessary to remove the entire structural coating to repair the component. In addition, for re-entrant shaped grooves, many of the above described processes reapply the structural coating without the use of a sacrificial filler.

Although only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method for repairing a component having a substrate comprising an outer surface and an inner surface, wherein the inner surface defines at least one hollow, interior space, wherein one or more grooves extend at least partially along the component,
the component further comprising a structural coating disposed over at least a portion of the outer surface of the substrate, a bond coating disposed over the structural coating, and a thermal barrier coating disposed over the bond coating,
wherein the structural coating comprises an inner structural coating layer disposed on the outer surface of the substrate and an outer structural coating layer disposed on the inner structural coating layer, wherein each groove is formed at least partially in the inner structural coating layer and wherein the outer structural coating layer bridges the groove,
wherein the one or more grooves and the outer structural coating together define one or more channels for cooling the component, the repair method comprising:
removing the thermal barrier coating;
removing the bond coating;
removing at least a portion of the outer structural coating layer in a vicinity of a damaged portion of the inner structural coating layer;
performing a repair operation on the damaged portion of the inner structural coating layer;
applying a repair outer structural coating layer over any exposed portions of the inner structural coating layer;
applying a repair bond coating over the repair outer structural coating; and
applying a repair thermal barrier coating over the repair bond coating.

2. The repair method of claim 1, wherein each groove has a base and a top, wherein the base of each groove is wider than the top, such that each groove comprises a re-entrant shaped groove, wherein the outer layer of the structural coating is applied without the use of a sacrificial filler, such that the outer layer of the structural coating is applied over open ones of the one or more re-entrant shaped grooves, and wherein the applied outer layer of the structural coating completely bridges the respective grooves, such that the applied outer layer of the structural coating seals the respective cooling channels.

3. The repair method of claim 1, wherein each groove has a base and a top, wherein each of the respective one or more grooves narrows at the respective top thereof, such that each groove comprises a re-entrant shaped groove, wherein the outer layer of the structural coating is applied without the use of a sacrificial filler, such that the outer layer of the structural coating is applied over open ones of the one or more re-entrant shaped grooves, and wherein the applied outer layer of the structural coating defines one or more porous gaps such that the applied outer layer of the structural coating does not completely bridge each of the respective grooves.

4. The repair method of claim 1, wherein the repair operation comprises performing one or more of:
machining a portion of at least one of the one or more grooves;
forming one or more additional grooves at least partially in the inner structural coating layer; and
removing one or more grooves from the inner structural coating layer.

5. A method for repairing a component having a substrate comprising an outer surface and an inner surface, wherein the inner surface defines at least one hollow, interior space, the component further comprising a structural coating comprising an inner structural coating disposed over at least a portion of the outer surface of the substrate and an outer structural coating disposed over the inner structural coating, a bond coating disposed over the outer structural coating, and a thermal barrier coating disposed over the bond coating, wherein the substrate and at least a portion of the inner structural coating define one or more grooves, wherein each groove extends at least partially along the outer surface of the substrate and at least partially in the inner structural coating layer, wherein each groove has a base and a top, wherein each of the respective one or more grooves narrows at the respective top thereof, such that each groove comprises a re-entrant shaped groove, wherein the one or more re-entrant shaped grooves and the structural coating together define one or more re-entrant shaped channels for cooling the component, the repair method comprising:
removing the thermal barrier coating;
removing the bond coating;
removing at least a portion of the structural coating in a vicinity of a damaged portion of the component;
performing a repair operation on the damaged portion of the component;
applying a repair structural coating at least in a vicinity of the repaired portion of the component;
applying a repair bond coating over the repair structural coating; and
applying a repair thermal barrier coating over the repair bond coating.

6. The repair method of claim 5, wherein the entire structural coating is removed, and wherein the repair structural coating is applied globally over the substrate after the repair operation has been performed.

7. The repair method of claim 5, wherein the repair structural coating is applied without the use of a sacrificial filler, such that the repair structural coating is applied over open ones of the one or more re-entrant shaped grooves.

8. The repair method of claim 5, wherein the repair operation comprises performing one or more of:
machining a portion of at least one of the one or more re-entrant shaped grooves;
forming one or more additional grooves in the substrate; and
removing one or more grooves from the substrate.

9. The repair method of claim 5, wherein each groove has at least one discharge end, the repair method further comprising:
forming a run-out region adjacent to the respective discharge point for each re-entrant shaped groove, wherein the run-out region is formed prior to the step of applying the structural coating, and wherein the applied structural coating does not bridge the one or more run-out regions, such that each run-out region forms a film hole for the respective re-entrant shaped groove.

10. The repair method of claim 5, wherein each groove has at least one discharge end, the repair method further comprising:
forming a run-out region adjacent to the respective discharge point for each re-entrant shaped groove, wherein the run-out region is formed prior to the step of applying the structural coating, wherein a portion of the applied structural coating is deposited in the one or more run-out regions; and
removing at least a portion of the applied structural coating deposited in each run-out region, such that each run-out region forms a film hole for the respective re-entrant shaped groove.

11. The repair method of claim 5, wherein each re-entrant shaped groove has at least one discharge end, the repair method further comprising:
forming a run-out region adjacent to the respective discharge point for each re-entrant shaped groove, wherein the run-out region is formed prior to the step of applying the structural coating, and wherein a footprint of each run-out region is narrower at the discharge point for the respective re-entrant shaped groove and wider at an opposite end of the run-out region, such that the run-out region forms a diffuser film hole.

12. The repair method of claim 5, wherein each groove has at least one discharge end, the repair method further comprising forming a crater prior to the step of applying the structural coating, such that the crater is in fluid connection with the respective discharge end for each groove, wherein the applied structural coating does not completely bridge each of the one or more craters, such that each crater defines a film exit.

13. The repair method of claim 12, wherein a portion of the applied structural coating is deposited in the one or more craters, the repair method further comprising removing at least some of the applied structural coating deposited in each crater to form the film hole for the respective channel.

14. The repair method of claim 5, further comprising repairing at least one connecting groove in the component, such that each connecting groove intersects at least a subset of the one or more re-entrant shaped grooves, wherein the connecting groove is repaired prior to the step of applying the structural coating, and wherein the applied structural coating does not completely bridge the connecting groove, such that the connecting groove at least partially defines an exit region for the respective one or more re-entrant shaped cooling channels.

15. The repair method of claim 14, wherein each of the one or more connecting grooves is open-shaped, and wherein a portion of the applied structural coating is disposed in the exit region of respective connecting grooves, the repair method further comprising removing at least a portion of the applied structural coating disposed in each exit region.

16. The repair method of claim 5, further comprising forming at least one trench in the component to at least partially define at least one exit region for the one or more cooling channels.

17. The repair method of claim 5, wherein performing the repair operation comprises performing one or more of:
repairing one or more connecting grooves that intersect at least a subset of the one or more re-entrant shaped grooves, wherein the applied structural coating does not completely bridge the connecting groove(s), such that each connecting groove at least partially defines an exit region for the respective one or more re-entrant shaped cooling channels;
repairing one or more run-out regions adjacent to a respective discharge point for each groove, wherein the structural coating does not bridge the one or more run-out regions, such that each run-out region forms a film hole for the respective re-entrant shaped groove;
repairing one or more craters, wherein each crater is in fluid connection with a respective discharge end for each groove, and wherein the locally applied structural coating does not completely bridge each of the one or more craters, such that each crater defines a film exit for the respective re-entrant shaped groove;
repairing one or more trenches in the component, wherein each trench at least partially defines at least one exit region for the one or more re-entrant shaped cooling channels; and
drilling one or more film holes through the thermal barrier coating, bond coating, and structural coating to intersect the respective groove(s).

18. The repair method of claim 5, wherein the structural coating comprises the bond coating, such that the thermal barrier coating is disposed on the structural coating.

19. The repair method of claim 5, wherein the structural coating and the bond coating are distinct coatings.

20. A method for repairing a component having a substrate comprising an outer surface and an inner surface, wherein the inner surface defines at least one hollow, interior space, the component further comprising a structural coating comprising an inner structural coating disposed over at least a portion of the outer surface of the substrate and an outer structural coating disposed over the inner structural coating, a bond coating disposed over the outer structural coating, and a thermal barrier coating disposed over the bond coating, the repair method comprising:
removing the thermal barrier coating;
removing the bond coating;
removing at least a portion of the structural coating in a vicinity of a damaged portion of the component;
forming one or more grooves in the substrate and at least partially in the inner structural coating layer, wherein each groove extends at least partially along the outer surface of the substrate;
applying a repair structural coating at least in a vicinity of the repaired portion of the component, wherein the one or more grooves and the applied repair structural coating together define one or more channels for cooling the component;
applying a repair bond coating over the repair structural coating; and
applying a repair thermal barrier coating over the repair bond coating.

21. The method for repairing a component of claim 20, further comprising performing a repair operation on the damaged portion of the component after removing at least the portion of the structural coating and prior to applying the repair structural coating.

22. The method for repairing a component of claim 21, wherein each groove has a base and a top, and wherein each of the respective one or more grooves narrows at the respective top thereof, such that each groove comprises a re-entrant shaped groove.

\* \* \* \* \*